United States Patent [19]

Lang et al.

[11] Patent Number: 4,943,851
[45] Date of Patent: Jul. 24, 1990

[54] 360 DEGREE VIEWING SYSTEM HAVING A LIQUID CRYSTAL DISPLAY SCREEN ENCIRCLING A ROTATABLE PROJECTION SCREEN

[75] Inventors: Paul W. Lang; Franklin C. Gribshaw, both of Orange, Calif.

[73] Assignees: Gold Stake; C. Allen Jensen; Gregory D. Levy, all of Pasadena, Calif.

[21] Appl. No.: 320,289

[22] Filed: Mar. 7, 1989

[51] Int. Cl.$^5$ .............................................. H04N 9/16
[52] U.S. Cl. ........................................ 358/87; 358/64; 350/331 R
[58] Field of Search ................... 358/61, 87, 232, 236, 358/64; 350/144, 130, 274, 273, 331 R, 334

[56] References Cited

U.S. PATENT DOCUMENTS

| | | | |
|---|---|---|---|
| 3,335,217 | 8/1967 | Bassett . | |
| 3,542,948 | 11/1970 | Wolff | 358/87 |
| 3,647,284 | 3/1972 | Elings et al. . | |
| 3,872,238 | 3/1975 | Herndon | 358/87 |
| 3,976,837 | 8/1976 | Lang . | |
| 3,992,718 | 11/1976 | Driskell | 358/87 |

Primary Examiner—Howard W. Britton
Assistant Examiner—Kim Yen Vu
Attorney, Agent, or Firm—Kelly, Bauersfeld & Lowry

[57] ABSTRACT

A viewing system is provided for presenting a projected image upon a rear projection screen that is rotated extremely rapidly about a vertical axis which exactly bisects the picture in the vertical plane. The rotational rate is such that an entire audience, regardless of their position about the viewing system, can view the projected image simultaneously. The 360° viewing system features an optical system which rotates with respect to a cathode ray tube about the vertical axis in synchronization with the rotation of the projection screen. A liquid crystal display (LCD) screen is utilized to define a viewing window which is continuously redefined at sequential intervals to remain continually aligned with the projection screen.

41 Claims, 3 Drawing Sheets

360 DEGREE VIEWING SYSTEM HAVING A LIQUID CRYSTAL DISPLAY SCREEN ENCIRCLING A ROTATABLE PROJECTION SCREEN

BACKGROUND OF THE INVENTION

This invention relates to image projection and television viewing systems. More particularly, this invention relates to a method and apparatus for enabling a centrally located televised picture to be viewed substantially simultaneously by an audience surrounding the picture over 360°.

The general problem in the display of a picture print, a television image or a projection onto a screen is that the picture is best viewed when the viewer's line of sight is precisely normal to the plane of the picture. This ideal condition is difficult to realize when several people wish to view the picture simultaneously from varied locations.

One solution to the above problem is simply to mount the picture on a rotating pedestal which will slowly rotate over 360° permitting several people surrounding the pedestal to eventually view the picture in a line of sight normal to the plane of the picture. Such systems are often times used in advertising displays in large areas such as railroad stations and the like. A problem with this arrangement is the fact that the rotation of the picture must be relatively slow in order to permit the various viewers to have an opportunity to study the picture. Such a slow rotation means that essentially only a few people at a time are viewing the picture while others out of the line of sight must wait until the picture comes into view.

There are many instances in which a plurality of people may wish to view a picture or displayed data simultaneously and continuously so that they can all carry on a meaningful discussion concerning the displayed information. For example, during business meetings a group of executives typically sit around a conference table, an arrangement which does not readily enable information presented on the table to be displayed to all in attendance. A great benefit would be realized if a means centrally located on the table were available which would permit everyone present to examine a picture or projected data substantially simultaneously. For example, the necessity of passing among the members of the group pictures to be successively viewed would be avoided. In addition, the ability to display data through a 360° range would prevent members from looking at a series of pictures out of order, a potential problem if duplicate sets of pictures were to be provided to each individual member.

Another drawback associated with conventional display systems is that special consideration must be given to the positioning of the display within its environment because, typically, conventional display systems, such as a television, cannot be viewed from the rear or extreme sides. Thus, the area within which a viewing audience can be accommodated is limited to locations with suitable sight lines. As a result, use of the space available around the display system is often limited by the presence of blind spots. Moreover, the positioning of furniture within a room can disadvantageously be dictated by a need to provide clear sight lines to a television, or the like.

In an attempt to overcome the viewing limitations associated with conventional displays, 360° viewing systems were developed, an example of which is shown in U.S. Pat. No. 3,976,837. Although such prior 360° viewing systems have provided significant advancements over the prior art, additional features have been considered desirable in order to provide a more commercially acceptable product.

There exists, therefore, a need for a visual display system that will enable an entire audience to view a televised picture simultaneously, regardless of their location around the display system. Additionally, an improved 360° viewing system is needed which utilizes a stationary cathode ray tube which compensates by optical means for the rotation of the display screen relative to the stationary cathode ray tube. Such a system would preferably be of simplified construction, and maximize the size of the projected image with respect to the overall physical housing for the viewing system. Moreover, a 360° viewing system is needed which provides a novel shutter arrangement that tracks the projected display as it rotates. The present invention fulfills these needs and provides further related advantages.

SUMMARY OF THE INVENTION

In accordance with the invention, an improved 360° viewing system is provided for enabling a televised picture to be viewed substantially simultaneously by an audience surrounding the picture over 360°. The novel 360° viewing system utilizes a cathode ray tube (CRT) that provides a non-rotating image. Light guiding means projects the image from the CRT onto a rear projection screen which rotates in timed relation to the light guiding means. The 360° viewing system features a liquid crystal display (LCD) screen that encircles the rotating rear projection screen and functions as a shutter for the viewing system. The LCD screen is synchronized with the rear projection screen such that a select number of consecutive transparent panels of the LCD screen define a window for viewing the rear projection screen. The window is continuously redefined as the panels sequentially become transparent or opaque to continuously present a transparent window that is synchronized to remain in viewing alignment with the rear projection screen.

The 360° viewing system has a broad range of applications, including advertising marquees, television sets and display screens for presenting travel information at airports, train stations and bus depots. The present invention advantageously enables information to be communicated simultaneously to a large audience because a 360° display is presented which maximizes sight lines to the viewing system and eliminates blind spots. This feature beneficially allows great flexibility in the positioning of furniture and the viewing system within a viewing area, thereby providing greater freedom of choice in the utilization of the space within the viewing area.

In accordance with a preferred form of the invention, a stationary means for projecting a picture, preferably a cathode ray tube (CRT), is disposed within a housing. Optical means comprising a projection lens and a dove prism refracts and processes the image from the CRT to light guiding means angulated to direct the image onto a projection screen for viewing. The optical means can include a right angle prism depending upon the orientation of the CRT within the housing. The light guiding means comprises first and second mirrors which reflect the image for display upon a rear projection screen.

Motor means located within the housing drives a gear arrangement which rotates the projection screen and first and second mirrors as a unit. The rotation of the projection screen and the mirrors occurs about a vertical axis which bisects in the vertical plane a display surface on the projection screen. The rotation of the projection screen enables any viewer in the audience to periodically have a line of sight normal to the plane of the picture. When the rotational rate in revolutions per minute is sufficiently great (preferably exceeding 900 rpm), and when a suitable shutter arrangement is used, all viewers surrounding the 360° viewing system will see the same picture substantially simultaneously and continuously.

The dove prism is rotated about the vertical axis by the gear arrangement at one-half the speed at which the projection screen and the mirrors rotate. The use of the rotating dove prism and mirrors obviates the need for the CRT to rotate in order to maintain a picture in correct orientation upon the rotating screen. Alternatively, a K-mirror can be used in place of the dove prism.

The liquid crystal display (LCD) screen encircles the rotating projection screen to provide a shutter for the viewing system. The LCD screen includes a plurality of LCD panels wherein, at any given instant, a select consecutive number of such panels are activated to become transparent and define a viewing window through which the image on the projection screen may be viewed. As the projection screen rotates, the LCD panels sequentially become transparent or opaque to continuously redefine a viewing window which is aligned with the projection screen. Circuit means ensures that the viewing window is presented around the LCD screen in synchronous relation with the rotation of the projection screen.

Advantageously, the shutter system provided by the LCD screen increases the visual clarity of the image on the projection screen. The viewing window defined by the shutter system is preferably smaller than the projection screen so that edges of the screen are not visible. Blurring which may be caused by viewing the edges of the rotating screen is eliminated.

A stationary transparent encasement surrounds the LCD screen. This encasement is adapted to reduce glare by utilizing tinted Plexiglas, or the like, and a concave exterior encasement surface.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawing.

DETAILED DESCRIPTION OF THE PREFERRED EMBODIMENT

Figure 1:
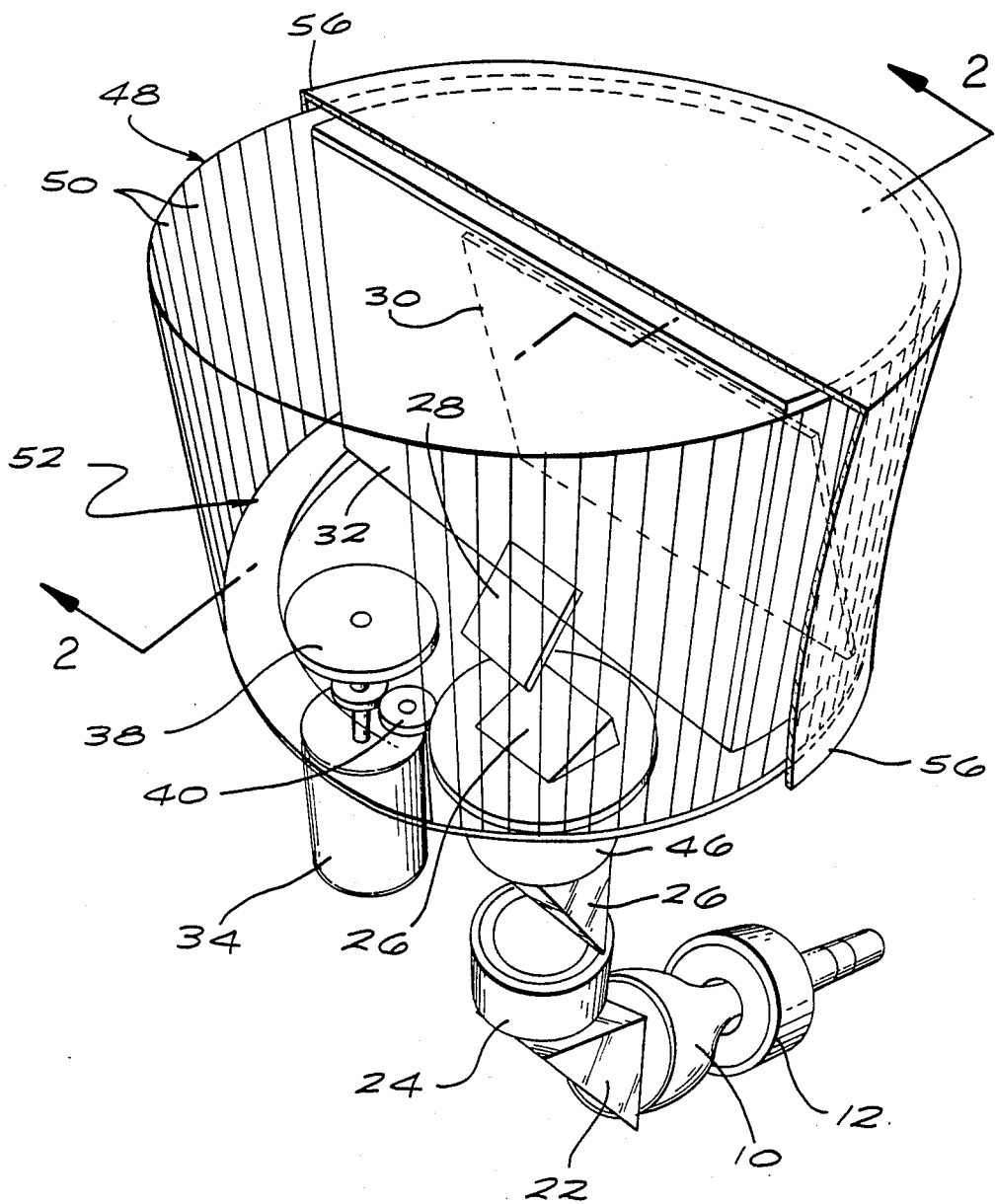
FIG. 1 is a perspective schematic view, partly in phantom, of a 360° viewing system embodying the invention, with its housing omitted to reveal the configuration of the optical components and gear means disposed therein, and also illustrating a liquid crystal display (LCD) screen functioning as a shutter system to define a window in synchronous alignment with a projection screen.

As shown in the drawings for purposes of illustration, the present invention resides in an improved 360° viewing system (FIG. 1) which enables a televised image to be viewed substantially simultaneously by an audience surrounding the picture. The 360° viewing system includes aligned optical means, light guiding means and a projection screen which all continuously rotate in synchronized timed relation such that a stationary picture provided by a cathode ray tube or the like, is continuously projected onto the projection screen while the screen is rotated so rapidly that all of the viewers can, in effect, view the same picture substantially simultaneously and continuously. Moreover, the present invention features novel use of a liquid crystal display (LCD) screen which encases the projection screen and defines a viewing window that is sequentially relocated about the LCD screen in synchronization with the rotation of the projection screen.

The 360° viewing system of the present invention can be used in television sets, advertising marquees and in display screens for presenting travel information at airports, train stations, etc. Another advantage of the 360° viewing system is that it enables information to be displayed simultaneously to a large audience regardless of the positioning of the viewing system within an area, because a 360° display is provided which maximizes sight lines and eliminates blind spots caused by a misaligned orientation of a viewer with respect to the display. This feature provides greater freedom of choice in the positioning of the viewing system because, for example, furniture arrangements will no longer be dictated by sight line considerations.

Figure 2:
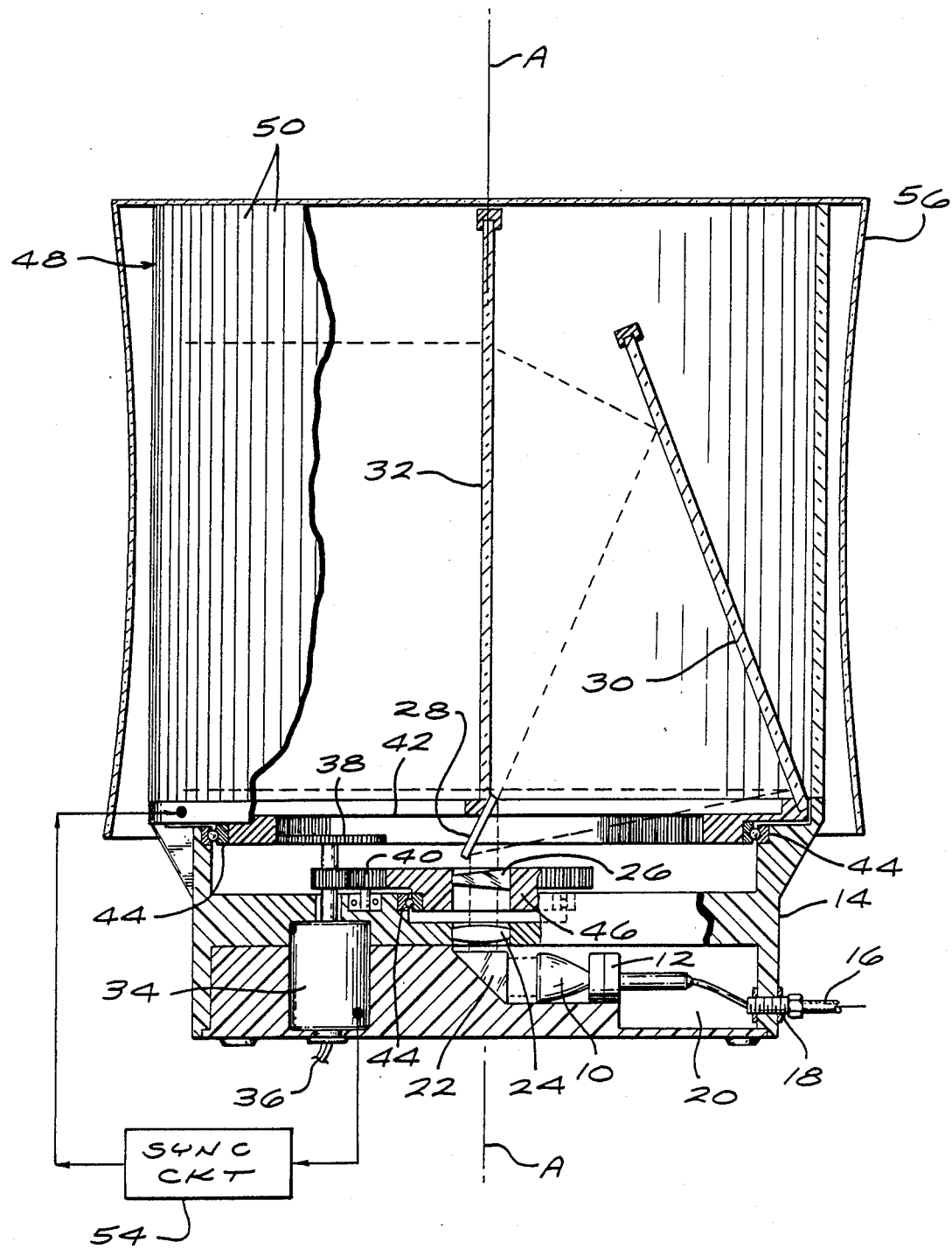
FIG. 2 is a cross-sectional view of the viewing system taken generally along the line 2—2 in FIG. 1, illustrating the housing and the arrangement of the optical components and gear means therein, and also illustrating an optical path from a CRT through a window in the LCD screen.

In accordance with the present invention, and with reference to FIGS. 1 and 2, a stationary cathode ray tube (CRT) 10 having a magnetic yoke 12 is disposed within a housing 14. The CRT 10 receives signals for generating a television picture via a cable 16 secured to a connector 18 located on the exterior of the housing 14. The CRT 10 can be vertically oriented within the housing 14, however, in the preferred, illustrated embodiment, the CRT 10 is horizontally positioned within a chamber 20 of the housing 14. The CRT 10, as well as the picture provided thereby, remain stationary throughout operation of the 360° viewing system. The housing 14 is preferably light-tight with all interior surfaces which may reflect unwanted extraneous light being painted flat black as a preventive measure.

Figure 3:
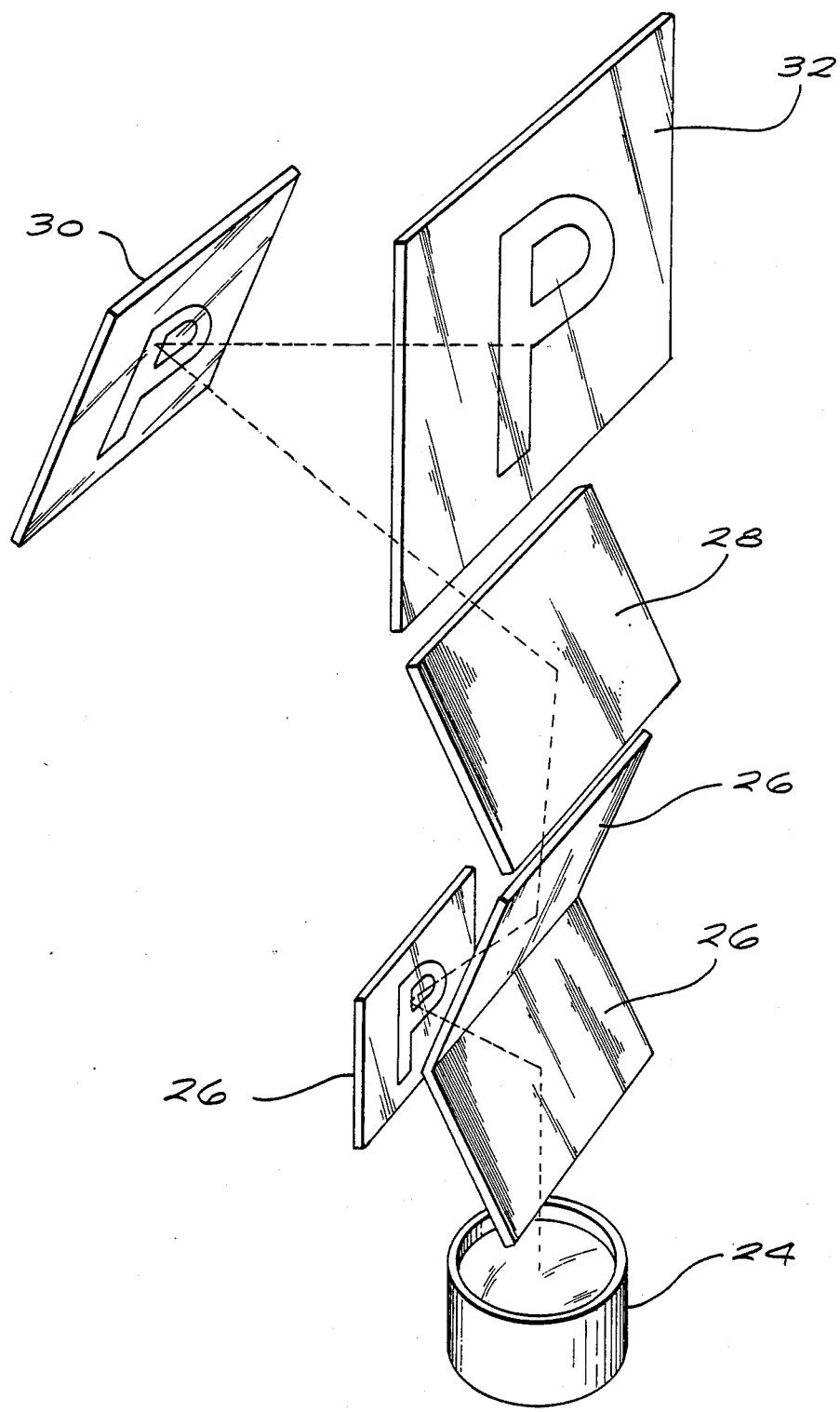
FIG. 3 is a perspective schematic view of the optical path from a projection lens to the projection screen.

A right angle prism 22 (which is omitted with use of a vertically oriented CRT) is provided to bend image generated by the CRT into alignment with a vertical axis A—A and through a projection lens 24 which diverges the image upwardly. A dove prism 26 is positioned within the housing 14 with its refractive axis being coaxial with the vertical axis A—A. This dove prism 26, otherwise known as a porro prism, is the equivalent of a K-mirror arrangement (illustrated in FIG. 3). The dove prism 26 is located to receive the image projected by the projection lens 24 and direct the image to a first mirror 28 disposed along the vertical axis A—A. It is entirely possible to obtain the effect of a dove prism by means of a system of first-surface mirrors arranged to perform the same function as the surfaces of the prism. Therefore, the term "dove prism" as used hereafter includes any such arrangement of mirrors, such as the K-mirror arrangement.

The first mirror 28 is positioned to intercept a projected image from the dove prism 26 and direct the projected image to a second mirror 30 which is positioned to reflect the image onto a rear projection screen 32. This results in the display of a picture on the projection screen 32 in a manner suitable for viewing. The optical pathway just described is presented schematically in FIG. 3 and is also indicated by dashed lines in FIG. 2.

An electric motor 34, connected to a power supply by a power cord 36, is positioned within the housing 14 to drive a gear arrangement including a main drive gear 38, secondary gears 40, and a base 42. The gear arrangement must be located within the housing 14 at positions which will not obscure the optical pathway between the CRT 10 and the projection screen 32.

The main drive gear 38 engages and rotates the base 42 which supports the rear projection screen 32, the first mirror 28 and the second mirror 30, such that these components will rotate as a unit. The base 42 rides upon bearings 44 disposed along an inner top edge of the housing 14, and is balanced for substantially vibration-free rotation.

An important design parameter is that the vertical axis A—A must precisely bisect the surface of the projection screen 32 upon which the picture is displayed, and the base 42 must be rotatable about the vertical axis A—A at a given number of revolutions per minute. When the foregoing conditions are met and the base 42 is rotated at a speed greater than 900 revolutions per minute, each viewer in a circle surrounding the viewing system will see the picture periodically at the precise moment the viewer's line of sight is normal to the plane of the picture. Due to the rapid rotation, all of the viewers surrounding the 360° viewing system can, in effect, view the same picture substantially simultaneously and continuously.

The dove prism 26 is also rotatable about the vertical axis A—A by means of the secondary gears 40, which rotate a shield 46 within which the dove prism is supported. The gear arrangement is such that the main drive gear 38 rotates the dove prism 26, the projection screen 32, and the first and second mirrors 28 and 30 in synchronized timed relation, and in the same direction. The secondary gears 40 which rotate the dove prism 26 are sized and shaped to ensure that the dove prism rotates at one half the speed of the projection screen 32 and the mirrors 28 and 30, i.e. at one-half the speed at which displayed images are to rotate. When the dove prism 26 is rotated on its refractive axis in alignment with the vertical axis A—A, the projected image will make two complete rotations for each rotation of the prism. For this reason, the dove prism is rotated at one-half the speed of the projection screen 32, thereby causing the image to rotate at the same speed as the projection screen and remain in sync therewith.

The provision of the rotating dove prism 26 obviates the need for the CRT 10 to rotate in order to maintain an image in proper orientation upon the projection screen 32. The synchronized rotation of the dove prism 26 and the mirrors 28 and 30 over the stationary CRT 10 provides the same effect as the prior practice of rotating the CRT in synchronization with a rotating projection screen.

Surrounding the rear projection screen 32 is a stationary liquid crystal display (LCD) screen 48 comprised of a plurality of LCD panels 50. The mirrors 28 and 30 are also enclosed by the LCD screen 48. The LCD screen 48 is activated to function as a shutter system, with a select number of consecutive LCD panels 50 becoming transparent in synchronization with the positioning of the rear projection screen 32, to define a viewing window 52 through which the projection screen 32 can be viewed.

In operation, the normally opaque LCD panels 50 sequentially become transparent adjacent to a leading vertical edge of the viewing window 52, and sequentially turn opaque adjacent to a trailing vertical edge of the viewing window such that the LCD panels continuously redefine the viewing window around the circular LCD screen 48 in synchronization with the rotation of the rear projection screen 32, so that the viewing window is continuously aligned with the projection screen. The direction of rotation of the projection screen 32 defines the aforementioned leading and trailing vertical edges of the viewing window 52.

Circuit means, schematically represented by box 54, are provided to synchronize this continuous redefinition of the viewing window 52 around the LCD screen 48 with the rotation of the projection screen 32.

The LCD screen 48 defines a viewing window 52 that is narrower than the projection screen 32 so that the edges of the projection screen are not normally visible. This practice eliminates blurring which would otherwise be caused by viewing the edges of the projection screen in motion. Thus, the LCD screen 48 provides a shutter arrangement which advantageously increases the visual clarity of an image displayed on the projection screen 32.

A stationary transparent encasement 56 encloses the LCD screen 48. The encasement 56 is preferably manufactured of Plexiglas and is adapted to reduce glare by, for example, the provision of tinting or a concave exterior surface.

The 360° viewing system of the present invention can be placed in a central location, such as on top of a conference table, about which are seated a number of persons who wish to view a picture. As the motor means 34 and gear arrangement rotate the projection screen 32 and the light guiding means as a unit at a rate greater than 900 revolutions per minute, with the dove prism 26 being synchronously rotated at half the rotational rate of the screen 32, a television picture or other image may be projected onto the projection screen 32 by the previously described optical system. The 360° viewing system can also be used to display a picture print affixed to the projection screen, slides or a microfiche film projected thereon. The rapid rotational rate results in each viewer seeing the picture clearly and distinctly each time that it is normal to the viewer's line of sight so that in effect, an entire group of gathered persons can view the same picture simultaneously.

From the foregoing, it will be appreciated that the 360° viewing system of the present invention advantageously enables a single picture to be viewed substantially simultaneously by a group of viewers located 360° around the system without requiring any rotational action by the cathode ray tube. Moreover, the 360° viewing system advantageously utilizes a shutter system which increases the visual clarity of a picture displayed on the projection screen.

While a particular form of the invention has been illustrated and described, it will be apparent that various modifications can be made without departing from the spirit and scope of the invention. Accordingly, it is not intended that the invention be limited, except as by the appended claims.

We claim:

1. A 360° viewing apparatus, comprising:
a projection screen;
means for rotating the projection screen;
an optical system for continuously projecting an image onto the projection screen;
a liquid crystal display (LCD) screen encircling the projection screen, the LCD screen defining a viewing window through which the image on the projection screen can be viewed, wherein the viewing window is continuously redefined about the LCD screen in synchronization with rotation of the projection screen such that the viewing window is continually aligned with the projection screen; and
means for synchronizing the continuous redefinition of the viewing window around the LCD screen with the rotation of the projection screen.

2. An apparatus as set forth in claim 1, wherein the projection screen is rotated in excess of 900 revolutions per minute, such that a plurality of viewers positioned about the viewing apparatus will each see the image a number of times every minute corresponding to the given number of revolutions per minute when each viewer's line of sight is normal to the image.

3. An apparatus as set forth in claim 1, wherein the LCD screen includes a plurality of normally opaque LCD panels and functions as a shutter system as a select number of consecutive LCD panels become transparent to define the viewing window, wherein the LCD panels sequentially become transparent adjacent a leading edge of the viewing window and sequentially become opaque adjacent a trailing edge of the viewing window such that the LCD panels continuously redefine the viewing window about the LCD screen.

4. An apparatus as set forth in claim 1, wherein the optical system comprises means for creating the image, light guiding means and optical means, wherein the optical means projects the image from the means for creating the image, and wherein the light guiding means intercepts and directs the projected image against a display surface on the projection screen.

5. An apparatus as set forth in claim 4, wherein the optical means includes a dove prism.

6. An apparatus as set forth in claim 5, wherein the means for rotating the projection screen includes means for synchronously rotating the projection screen and the light guiding means at a predetermined rate of rotation, and also rotating the dove prism in the same direction at half the predetermined rate of rotation.

7. An apparatus as set forth in claim 5, wherein the optical means includes a projection lens situated optically between the means for creating the image, and the dove prism.

8. An apparatus as set forth in claim 4, wherein the means for creating the image includes a stationary cathode ray tube.

9. An apparatus as set forth in claim 8, wherein the optical means includes a right angle prism situated optically between the cathode ray tube and the light guiding means.

10. An apparatus as set forth in claim 4, wherein the projection screen is rotated about a vertical axis which bisects the display surface, wherein the light guiding means includes at least one mirror disposed along the vertical axis and which is rotatable thereabout.

11. An apparatus as set forth in claim 1, wherein the projection screen is a rear projection screen.

12. An apparatus as set forth in claim 1, wherein the LCD screen is positioned within a reduced-glare transparent encasement.

13. A 360° viewing apparatus, comprising:
a rotatable projection screen;
means for providing a non-rotating image;
an optical system for continuously projecting the image onto the projection screen, the optical system comprising optical means for projecting the image from the image providing means, and light guiding means for intercepting and directing the image onto the projection screen;
means for rotating the projection screen at a given number of revolutions per minute, such that a plurality of viewers surrounding the viewing apparatus will each see the image a number of times every minute corresponding to the given number of revolutions per minute when their line of sight is normal to the image, the given number of revolutions per minute being sufficient to permit all viewers to see the same image substantially simultaneously and continuously;
means for rotating the light guiding means at the given number of revolutions per minute, wherein the projection screen and the light guiding means rotate as a unit;
a liquid crystal display (LCD) screen encircling the projection screen, the LCD screen having a plurality of LCD panels and functioning as a shutter system as a select number of consecutive LCD panels become transparent to define a viewing window through which the image on the projection screen can be viewed, wherein the LCD panels subsequently become transparent adjacent a leading edge of the viewing window and sequentially become opaque adjacent a trailing edge of the viewing window such that the LCD panels continuously redefine the viewing window about the LCD screen in synchronization with rotation of the projection screen so that the viewing window is continually aligned with the projection screen; and
means for synchronizing the continuous redefinition of the viewing window around the LCD screen with the rotation of the projection screen.

14. An apparatus as set forth in claim 13, wherein the optical means includes a dove prism positioned in the path of the projected image such that the dove prism directs the projected image to the light guiding means, wherein the dove prism is rotated in the same direction as the projection screen and the light guiding means at one-half the rate of rotation of the projection screen.

15. An apparatus as set forth in claim 14, including gear means for rotating both the projection screen and the dove prism.

16. An apparatus as set forth in claim 14, wherein the projection screen rotates at a rate of at least 900 revolutions per minute.

17. An apparatus as set forth in claim 13, wherein the means for providing a non-rotatable image includes a stationary cathode ray tube.

18. An apparatus as set forth in claim 14, wherein the light guiding means includes first and second mirrors, wherein the first mirror is positioned to intercept the projected image from the dove prism and reflect the image to the second mirror, and wherein the second mirror is positioned to intercept the reflected image from the first mirror and reflect the image onto the projection screen.

19. An apparatus as set forth in claim 18, wherein the dove prism, the first mirror and the projection screen are all located on a rotational axis.

20. An apparatus as set forth in claim 19, wherein the rotational axis bisects a display surface on the projection screen.

21. An apparatus as set forth in claim 19, wherein the optical means includes a projection lens and a right angle prism optically positioned between the dove prism and the means for providing a non-rotatable image, wherein the projection lens and the right angle prism are situated along the rotational axis.

22. An apparatus as set forth in claim 13, wherein the LCD screen is positioned within a transparent encasement which is adapted to reduce glare.

23. A 360° viewing apparatus comprising:
a housing;
a cathode ray tube within the housing, for providing a non-rotating televised image;
a rear projection screen rotatable about a primary axis which bisects a planar surface of the screen;
an optical system for continuously projecting the televised image onto the projection screen, the optical system including optical means for projecting the televised image from the cathode ray tube, and light guiding means for intercepting and directing the projected image onto the projection screen;
means for rotating the projection screen and the light guiding means at a given number of revolutions per minute, such that a plurality of viewers surrounding the viewing apparatus will each see the televised image a number of times every minute corresponding to the given number of revolutions per minute when their line of sight is normal to the image, the given number of revolutions per minute being sufficient to permit all viewers to see the same image substantially simultaneously and continuously;
a liquid crystal display (LCD) screen encircling the projection screen, the LCD screen defining a viewing window through which the image on the projection screen can be viewed, wherein the viewing window is continuously redefined about the LCD screen in synchronization with rotation of the projection screen and the light guiding means, such that the viewing window is continually aligned with the projection screen; and
circuit means for synchronizing the continuous redefinition of the viewing window around the LCD screen with the rotation of the projection screen.

24. An apparatus as set forth in claim 23, wherein the projection screen and the light guiding means turn at a rate of at least 900 revolutions per minute.

25. An apparatus as set forth in claim 23, wherein the means for rotating the projection screen and the light guiding means includes motor means and a gear arrangement, wherein the optical means includes a dove prism positioned in the path of the projected image such that the dove prism directs the projected picture to the light guiding means, and wherein the gear arrangement rotates the dove prism at one-half the rate of rotation of the projection screen and the light guiding means, in the same direction.

26. An apparatus as set forth in claim 23, wherein the LCD screen includes a plurality of normally opaque LCD panels and functions as a shutter system as a select number of consecutive LCD panels become transparent to define the viewing window, wherein the LCD panels sequentially become transparent adjacent a leading edge of the viewing window and sequentially become opaque adjacent a trailing edge of the viewing window such that the LCD panels continuously redefine the viewing window about the LCD screen.

27. An apparatus as set forth in claim 26, wherein the viewing window is smaller than the projection screen.

28. An apparatus as set forth in claim 25, wherein the projection screen, the light guiding means and the dove prism are rotated about the primary axis.

29. A method of presenting an image to an audience generally surrounding the image such that all viewers see the same image substantially simultaneously, the steps comprising:
providing a non-rotating image;
refracting the non-rotating image through a projection lens;
rotating the image from the projection lens at a given speed;
reflecting the rotating image onto a projection screen;
rotating the projection screen in synchronization with the rotation of the image;
presenting a window in a normally opaque shutter surrounding the projection screen; and
rotating the window around the shutter in synchronization with the rotation of the image.

30. A method as set forth in claim 29, wherein the image rotates at a rate in excess of 900 revolutions per minute.

31. A method as set forth in claim 29, wherein the step of rotating the image includes refracting the image through a rotating dove prism.

32. A method as set forth in claim 31, wherein the dove prism rotates at one-half the speed of the rotating projection screen.

33. A method as set forth in claim 31, wherein the step of reflecting the rotating image includes bending the image from the dove prism with light guiding means rotating in synchronization with the rotating image.

34. A method as set forth in claim 33, wherein the step of reflecting the rotating image includes rotating the dove prism, the light guiding means, and the projection screen about a common axis.

35. A method of presenting an image to an audience generally surrounding the image such that all viewers see the same image substantially simultaneously, the steps comprising:
providing a non-rotating image along a first axis;
bending the non-rotating image from the first axis and aligning it along a second axis;
rotating the image along the second axis at a given speed;
reflecting the rotating image onto a projection screen;
rotating the projection screen in synchronization with the rotation of the image; and
presenting a window in a normally opaque shutter surrounding the projection screen, and moving the window around the shutter in synchronization with the rotation of the image.

36. A method as set forth in claim 35, wherein the image rotates at a rate in excess of 900 revolutions per minute.

37. A method as set forth in claim 35, wherein the step of bending the non-rotating image includes passing the non-rotating image through a right angle prism and refracting the non-rotating image through a projection lens.

38. A method as set forth in claim 35, wherein the step of rotating the image includes refracting the image through a rotating dove prism.

39. A method as set forth in claim 38, wherein the dove prism rotates at one-half the speed of the rotating projection screen.

40. A method as set forth in claim 35, wherein the step of reflecting the rotating image onto a projection screen includes bending the image from the second axis using light guiding means rotating in synchronization with the rotating image.

41. A method as set forth in claim 35, wherein the step of presenting a window includes defining the window with a select number of consecutive transparent LCD panels, and wherein the step of moving the window around the shutter includes sequentially changing LCD panels to be transparent adjacent to a leading edge of the window and sequentially changing LCD panels to be opaque adjacent to a trailing edge of the window.

* * * * *

UNITED STATES PATENT AND TRADEMARK OFFICE
CERTIFICATE OF CORRECTION

PATENT NO. : 4,943,851

DATED : July 24, 1990

INVENTOR(S) : Paul W. Lang and Franklin C. Gribshaw

It is certified that error appears in the above-identified patent and that said Letters Patent is hereby corrected as shown below:

In column 4, line 56, insert --an-- between "bend" and "image".

In column 8, line 39, delete the word "subsequently" and insert therefor --sequentially--.

Signed and Sealed this

Seventh Day of January, 1992

Attest:

HARRY F. MANBECK, JR.

*Attesting Officer*    *Commissioner of Patents and Trademarks*